3,395,198
POLYOLEFIN COMPOSITION CONTAIN-
ING ETHYLENE - AMINOALKYL AC-
RYLATE COPOLYMER
Isoji Taniguchi, Ken-Ichi Maemoto, Yoshiharu Tatsukami, and Yoshio Kobayashi, Niihama, and Tomohide Yasumura and Reizo Yamadera, Shiga-ken, Japan, assignors to Sumitomo Chemical Co., Ltd., and Toyo Spinning Co., Ltd., both of Osaka, Japan
No Drawing. Filed Feb. 17, 1965, Ser. No. 433,486
Claims priority, application Japan, Feb. 21, 1964, 39/9,696; Sept. 28, 1964, 39/55,594
11 Claims. (Cl. 260—897)

ABSTRACT OF THE DISCLOSURE

The present invention provides improved polyolefin compositions comprising (a) a poly-1-monoolefin and (b) a copolymer of ethylene and an amino alkyl acrylate compound having the following formula

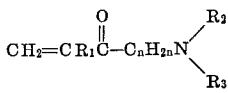

The polyolefin compositions may be molded into fibers, films and other shaped articles and possess improved dyeing properties.

---

The present invention relates to improved polyolefin composition and, more particularly, to polyolefin composition and, more particularly, to polyolefin composition with improved dyeability. More particularly, it relates to a polyolefin composition comprising a polyolefin and a copolymer of ethylene and an aminoalkyl acrylate compound. In the instant specification the term "polyolefin" is used to refer to poly-1-monoolefins.

It is known that polyolefins, e.g. crystalline polypropylene and polyethylene, may be molded into fibers, films and other shaped articles possessing excellent physical and mechanical properties. These polyolefins, however, are not free from disadvantages, but actually have some inherent drawbacks which restrict their application to certain shaped articles. For example, since polyolefins themselves are hydrophobic and chemically inert, conventional dyeing methods using conventional dyestuffs are inapplicable to these compounds, for they cannot be dyed to deep shades with high fastness to sunlight and to laundering and dry cleaning.

For the above reason, much study has been done for many years to improve the affinity of polyolefins for dyestuffs and a number of processes have heretofore been proposed.

Among these processes, the most promising are those in which certain substances having an affinity for particular dyestuffs are added to polyolefins. However, the additives which have conventionally been employed for such purposes are usually poor in compatibility with polyolefins and, when they are admixed with polyolefins, some conspicuous phase-separation is observed so that no homogeneous composition can be obtained. When an additive used to improve the dyeability of a polyolefin is dispersed in the polyolefin in the form of rough or coarse particles without forming a homogenous mixture, the dyeing efficiency is considerably low as compared with a solid solution or other similar state and, moreover, the whole state adversely affects the process of melt-spinning. For example, the filaments might be cut at the outlet of the spinnerette nozzle, or the overall drawability of the filaments would be lowered. Thus, the physical properties of the final fiber would be unsatisfactory. Moreover, as the filaments are subject to frictional forces upon drawing or other subsequent treatment, the additive would be separated from the polyolefin, giving rise to undesirable phenomena such as uneven dyeing.

In order to overcome the above-mentioned disadvantages of the conventional methods and to improve the affinity to dyestuffs and other properties of polyolefins, we have studied a number of polyolefin additives and found that when a copolymer of ethylene and an aminoalkyl acrylate compound is added to polyolefin, the resulting composition meets such requirements, and that such a polyolefin composition is fully comparable with polyolefin itself in both physical and mechanical properties and, yet, is far superior to polyolefin alone in dyeability and fastness.

The object of the present invention is to provide homogeneous polyolefin compositions which are least liable to undergo phase-separation and have an improved affinity to dyestuffs. Other objects will be apparent from the following description.

In order to accomplish these objects this invention provides moldable polyolefin composition comprising a polyolefin and at least a member selected from the group consisting of copolymers of ethylene and an aminoalkyl acrylate compound having the following general formula:

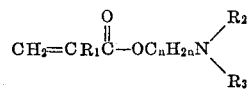

wherein $R_1$ is a member selected from the group consisting of hydrogen and methyl radical, each of $R_2$ and $R_3$ is a member selected from the group consisting of hydrogen atom and alkyl radicals having 1 to 4 carbon atoms, and $n$ is an integer of 1 to 4 inclusive.

The polyolefins which are used as the basic component of the present invention are poly-1-monoolefins and include, for example, polyethylene, polypropylene, polybutene-1, poly-4-methylpentene-1, and the like. The commercial value of the isotactic polypropylene synthesized with the Ziegler-Natta catalyst is particularly enhanced by the embodiment of this invention.

One component used in the production of the above-mentioned copolymer which, with polyolefins, is used to make up the compositions of this invention, is an aminoalkyl acrylate compound of the general formula:

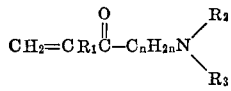

wherein $R_1$ is a member selected from the group consisting of hydrogen atom and methyl radical, $R_2$ and $R_3$ each is a member selected from the group consisting of hydrogen atom and alkyl radicals having 1–4 carbon atoms, and $n$ is an integer of 1 to 4 inclusive. Examples of $R_2$ and $R_3$ include methyl, ethyl, n-propyl, isopropyl, n-butyl, isobutyl and t-butyl radicals. Examples of —$C_nH_{2n}$ group in the above formula include methylene, ethylene, trimethylene, tetramethylene, dimethylmethylene, methylethylmethylene, dimethylethylene, methyltrimethylene and the like.

The aminoalkyl acrylate compounds which are represented by the above general formula include, for example, aminomethyl acrylate, aminoethyl acrylate, amino-n-butyl acrylate, N-methylaminoethyl acrylate, N-ethylaminoethyl acrylate, N-ethylaminoisobutyl acrylate, N-ethylamino - n - butyl acrylate, N-isopropylaminomethyl acrylate, N-isopropylaminothyl acrylate, N-n-butylaminoethyl acrylate, N-t-butylaminoethyl acrylate, N,N-dimethylaminomethyl acrylate, N,N-dimethylaminoethyl acrylate, N,N-dimethylaminoisopropyl acrylate, N,N-dimethylamino-n-butyl acrylate, N-methyl-N-ethylaminoethyl acrylate, N-methyl-N-n-butylaminoethyl acrylate, N,N- diethylaminoethyl acrylate, N,N-diisopropylaminoethyl acrylate, N,N-di-n-propylamino-n-propyl acrylate, N,N-di-n-propylamino-n-propyl acrylate, N,N-di-n-butylaminoethyl acrylate, N,N-di-n-butylamino-n-propyl acrylate, and other acrylates, as well as the corresponding esters of methacrylic acid.

Referring to the aminoalkyl acrylate compounds having the above general formula, if $R_2$ and $_3$ each represent an alkyl radical containing 5 or more carbon atoms or $n$ is an integer of 5 or more, the molecular weight of the aminoalkyl acrylate compound units will be so high that so long as it is added to polyolefin in such an adequate range as will be mentioned hereinafter, no substantial contributon to the dye-ability of polyolefin can be expected. On the other hand, if such a copolymer were added to polyolefin in a large excess amount, there would be realized some improvement in dyeability but the resulting composition would no longer possess the desirable mechanical properties intrinsic in polyolefin, therefore, the entire effort to improve the dyeability of polyolefin would prove virtually futile.

The copolymers of ethylene and the aminoalkyl acrylate compounds having the above general formula are preferably those which contain 1 to 50 mole percent of aminoalkyl acrylate compound and which have an intrinsic viscosity of 0.1 to 4.0 dl./g. measured in tetralin solution at 130° C. The copolymers containing less than 1 mole percent of aminoalkyl acrylate compound units do not substantially contribute to improvements in the dyeability of polyolefin when added to the latter in such an adequate range as will be mentioned hereinafter and if the amounts of such copolymers were large excess, the compositions would no longer possess the desirable mechanical properties of polyolefin, although the affinity of the compositions for dyestuffs could be enhanced. Generally speaking, therefore, such copolymers cannot be used for the purpose of improving the dyeability of polyolefin. On the other hand, those copolymers which contain more than 50 mole percent of aminoalkyl acrylate compound units are extremely poor in compatibility with polyolefin and, therefore, are not satisfactory for the purpose of improving the dyeability of polyolefin. While intrinsic viscosity is correlated with molecular weight, the copolymers falling into the above-mentioned viscosity range of 0.1–4.0 dl./g. are readily miscible with polyolefin to form substantially homogeneous compositions. It should also be understood that since the copolymers of the described type generally melt at lower temperatures than do polyolefins, the copolymers whose intrinsic viscosity values fall into the above-mentioned range may be employed without reservation, but that when polyolefins having extremely low melting points are employed, the copolymers are preferably those ones which melt in the neighborhood of, or below, the melting point of the particular polyolefin.

The above-mentioned copolymers which constitute one of the components of the present composition may usually be produced by contacting ethylene with an aminoalkyl acrylate compound having the above-mentioned general formula in the presence of at least free-radical catalyst which may be selected from the group consisting of oxygen, organic peroxides, azo compounds, diazo compounds, and the like at a pressure (ethylene) of 500 to 4000 kg./cm.$^2$ and at a temperature of 40 to 300° C.

In adding such a copolymer to polyolefin, about 0.1 to 30 weight percent (based upon the polyolefin) of the copolymer is added to polyolefin. Then, the resulting composition would be substantially homogeneous and have a great affinity to dyestuffs, without adversely affecting the desirable mechanical properties of the polyolefin. It is a feature of this invention that both homogeneity and improved dyeability of the composition are attained at the same time. If the amount of said copolymer were below 0.1% by weight based on the polyolefin, the dyeability of the resulting composition would not be as high as practically desirable, while if more than 30% by weight (based upon the polyolefin) of the copolymer were used, the composition might lose, in substantial degrees, the desirable characteristics of the polyolefin. While it depends on the desired depth of shade, the particularly preferred range of amount of the copolymer is generally from 1 to 15 weight percent for fiber and 1 to 25 weight percent for films and other shaped articles, the percentage being based upon the weight of the polyolefin.

The above-mentioned component materials of the present invention may be readily admixed mechanically to prepare a homogeneous composition. The admixing or blending can thus be performed by means of a Banbury mixer or other suitable mixer at elevated temperature or, alternatively, the multi-stage extruding technique may be utilized to perform the required mixing and extrusion at the same time. In the course of mixing or prior thereto, some suitable polyolefin stabilizer, antioxidant (e.g. alkylphenol compounds), ultraviolet-absorption inhibitor (e.g. benzophenone derivatives), heat-resisting stabilizer (e.g. the thioether compound of carboxylic acid ester) and/or other additives such as the metal salt of higher fatty acid may also be added to the compositions without departing from the scope of the present invention. In this case, the benefit of stabilization of polyolefin itself is also realized in addition to the advantageous characteristics of the present compositions.

The compositions of the present invention have a high affinity to acid dyestuffs, metallized dyestuffs, chrome dyestuffs, and other anionic dyestuffs. This affinity is particularly great to acid dyestuffs, which are exemplified by Xylene Light Yellow 2GP (C.I. Acid Yellow 29, trademark of Sandoz), Xylene-Fast Yellow P (C.I. Acid Yellow 61, trademark of Sandoz), Carbolan Yellow 3GS (C.I. Acid Yellow 72, trademark of I.C.I), Azo Rubinol 3GS (C.I. Acid Red 37, trademark of Sandoz), Xylene Fast Red P (C.I. Acid Red 118, trademark of Sandoz), Carbolan Crimson 3B (C.I. Acid Red 139, trademark of I.C.I.), Alizarine Light Blue 4GL (C.I. Acid Blue 23, trademark of Sandoz), Xylene Fast Blue P (C.I. Acid Blue 82, trademark of Sandoz), Xylene Fast Blue PR (C.I. Acid Blue 129, trademark of Sandoz), Xylene Fast Violet P3R (C.I. Acid Violet 47, trademark of Sandoz), Alizarine Light Violet RS (C.I. Acid Violet 43, trademark of Sandoz), Alizarine Light Green GS (C.I. Acid Green 25, trademark of Sandoz), Carbolan Green G (C.I. Acid Green 27, trademark of I.C.I.), Hat Fast Black FS (Acid Black, trademark of Sandoz), Xylene Brilliant Black BN (Acid Black, trademark of Sandoz), and the like.

The compositions of this invention also have a high affinity to metallized dyestuffs and chrome dyestuffs. The metallized dyestuffs mentioned just above include, for example, Neolan Yellow BE (C.I. Acid Yellow 54), Neolan Orange GRE (C.I. Acid Orange 62), Neolan Red GRE (C.I. Acid Red 183), Neolan Pink BE (C.I. Acid Red 195), Neolan Blue 2G (C.I. Acid Blue 158), Neolan Violet 3R (C.I. Acid Violet 56), Neolan Green BL (C.I. Acid Green 12) Neolan Brown 2G, Neolan Black WA (C.I. Acid Black 52), Cibalan Yellow GRL (C.I. Acid Yellow 116), Cibalan Orange RL (C.I. Acid Orange 88), Cibalan Red 2GL (C.I. Acid Red 211), Cibalan Scarlet GL (C.I. Acid Red 209), Cibalan Blue BL (C.I. Acid Blue 168, Cibalan Brown BL (C.I. Acid Brown 19), Cibalan Green GL (C.I. Acid Green 43), Ciblan Grey BL (C.I. Acid Black 60) (the above names are all the trademarks of Ciba, Ltd.) and the like.

The above-mentioned chrome dyestuffs include, for example, Sunchromine Yellow GG (C.I. Mordant Yellow 1), Sunchromine Red B (C.I. Mordant Red 15), Sunchromine Fast Blue MB (C.I. Mordant Blue 13), Sunchromine Black A (C.I. Mordant Black 1), Sunchromine Blue Black B (C.I. Mordant Black 3) (the above names are all the trade marks of Sumitomo Chemical Co., Ltd.), and the like.

Comparisons of dyeability may be made visually with respect to the shades of molded products, but for accuracy, measurements may be carried out by means of optical instruments, or from the amount of dye exhaustion per unit quantity of products. Particularly in the case of fiber, it is ordinary to take the dye exhaustion amount as criteria.

The compositions of this invention are dyeable up to 100 mg./g. within the serviceable range, although the figure depends upon the type of dyestuff used and amount of the copolymer in the composition. Even in the case of the present compositions suited for fiber making, as high as 50 mg. of dyeing is possible.

Furthermore, the dyed fibers have high fastness to sunlight, laundering, dry cleaning, and other conditions. The homogeneity of the compositions of this invention may be clearly seen when the dyed film is examined with the naked eyes or under a microscope and, when the dyed fiber bundle is set with epoxy resin and cut, and its cross-section is microscopically examined.

The fact that the compositions of this invention are substantially homogeneous can also become apparent when one considers the fact that the mechanical strength of the products made from the same are almost equal to that of the polyolefin used. For example, the strength of the yarn spun from the present composition consisting of polypropylene and 10% by weight (based on the polypropylene) of ethylene - N,N - dimethylaminoethyl acrylate copolymer is virtually identical to the strength of the yarn spun from the same polypropylene itself under the same conditions. In contrast, the polypropylene compositions containing similar amounts of conventional additives inevitably degrade 10% or more. Furthermore, the compositions of this invention are superior to conventional compositions in moldability and in that particularly, when they are formed into fibers, there is a reduced tendency for cut or uneven filaments.

It will be apparent from the above description that the compositions of this invention have improved affinities to dyestuffs, retaining the desirable mechanical properties of polyolefin. It is also to be noted that the compositions are also superior to the material polyolefin in printing qualities. Thus, the films or other large-faced products made of these compositions can be printed attractively.

Furthermore, whereas polyolefin are electrically insulating by nature and may be charged by friction to exclude it from some applications, the compositions of this invention are far less chargeable and, therefore, can be safely used for such applications.

It should also be noted that when a three or more component copolymer composed of ethylene, aminoalkyl acrylate compound, and one or more members of the group consisting of vinyl acetate, acrylates, maleates, and other ethylene derivatives and the like is added to polyolefin, similar results can be obtained as those obtained by the addition of a copolymer of ethylene and aminoalkyl acrylate compound.

This invention will be further explained in detail with reference to the following examples which are given by way of illustration only and not by way of limitation.

EXAMPLE 1

A copolymer of ethylene and N,N-dimethylaminoethyl acrylate, containing 6.1 mole percent of N,N-dimethylaminoethyl acrylate units and having melting point of 105° C. and an intrinsic viscosity of 0.65 dl./g. as measured in tetralin solution at 135° C. was added to polypropylene powder in an amount of 10% weight to the polypropylene powder and blended together. The mixture was extruded into filaments at a temperature of 250° C. The filaments were drawn to 400% their initial length in hot water and then heat-treated at 120° C. for 30 minutes to prepare a fiber.

The fiber was found to have a strength value of 4.07 g./d. and an elongation value of 42.9%. Thus, compared with the strength of 4.15 g./d. and elongation of 50.3% for the propylene fiber containing none of said copolymer, there could be observed no reduction in strength due to mix-spinning.

The fiber prepared above was dyed with a dyeing bath containing 3% OWF of acid dyestuffs (Xylene Fast Red P, trademark of Sandoz), 5% of $H_2SO_4$, and 5% of nonionic surfactant (liquid ratio, 50:1) at 100° C. for 1 hour. In this manner, the fiber was dyed in deep red shade. The fastnesses of the dyed fiber to sunlight, laundering, and rubbing were found to be equal to the JIS 5th grade, and the degree of its fastness to dry cleaning with perchloroethylene was also found to correspond to the JIS 5th grade. Moreover, when the cross section of the fiber was examined under a microscope, it was found that the fiber had been uniformly dyed. A rubbing test which consisted in rubbing a swatch (38 x 33 x 1 mm.) of test fabric with a linnel cloth showed that the fabric containing said copolymer was charged $-3.2 \times 10^3$ volts, whereas the polypropylene fabric containing none of said copolymer was charged $-7.8 \times 10^3$ volts.

EXAMPLE 2

A fiber prepared in similar way as in Example 1 was dyed with a dyeing bath containing 3% OWF of 1:1 metallized dyestuff (Neolan Blue 2G, trademark of Ciba, Ltd.), 5% OWF of $H_2SO_4$, and 5% OWF of nonionic surfactant (liquid ratio, 50:1) at 100° C. for 1 hour.

In this way, the fiber was dyed in deep blue shade. The fastnesses of the dyed fiber to sunlight and laundering were found to be equal to the JIS 5th grade and its fastness to dry cleaning with perchloroethylene also corresponding to the JIS 5th grade.

EXAMPLE 3

A fiber prepared in similar way as in Example 1 was dyed with a dyeing bath containing 8% OWF of chrome dyestuff (Sunchromine Black A trademark of Sumitomo Chemical Co., Ltd.), 5% OWF of $H_2SO_4$, and 5% OWF of nonionic surfactant (liquid ratio, 50:1) at 120° C. for 1 hour. After washing with water, the dyed fiber was further treated with a bath containing 4% OWF of potassium dichromate and 2% OWF of formic acid (liquid ratio, 50:1) at 100° C. for 40 minutes, whereby chroming was conducted. The fiber was dyed in attractive black shade. The fastnesses of this dyed fiber were: sunlight and laundering; 5th grade, rubbing; 4th grade, dry cleaning with perchloroethylene; 5th grade.

EXAMPLE 4

An ethylene-aminoethyl acrylate copolymer containing 22 mole percent of aminoethyl acrylate units and having a melting point of 100° C. and an intrinsic viscosity of 0.72 dl./g. measured in tetralin solution at 135° C. was added to polypropylene powder in an amount of 10% by weight based on the polypropylene powder and blended. The resulting mixture was extruded into filaments at 210° C. The filaments were drawn to 400% their initial length in hot water and then heat-treated at 120° C. for 20 minutes to prepare a fiber. This fiber was dyed with a dyeing bath containing 3% OWF of acid dyestuff (Xylene Fast Blue PR, trademark of Sandoz), 5% OWF of $H_2SO_4$ and 5% OWF of nonionic surfactant (liquid ratio 50:1) at 100° C. for 1 hour.

The dyed fiber was in deep blue shade. The fastnesses of the dyed fiber to sunlight, laundering and rubbing were found to be equal to the JIS 5th grade respectively, and its fastness to dry cleaning with perchloroethylene also correspond to the JIS 5th grade. A microscopic examination of the cross-section of this fiber revealed that it had been uniformly dyed.

EXAMPLE 5

An ethylene-N-methylaminoethyl acrylate copolymer containing 10.2 mole percent of N-methylaminoethyl acrylate units and having an intrinsic viscosity of 0.55 dl./g. as measured in tetralin solution at 135° C. was added to polypropylene powder in an amount of 2% by weight based upon the polypropylene powder and blended. The mixture was extruded into filaments at 210° C. The filaments were drawn to 400% their initial length in hot water and then heat-treated at 120° C. for 30 minutes to prepare a fiber. This fiber was dyed with a dyeing bath containing 3% OWF of acid dyestuff (Xylene Fast Yellow P, trademark of Sandoz), 5% OWF of $H_2SO_4$, and 5% OWF of nonionic surfactant (liquid ratio 50:1) at 100° C. for 1 hour. In this way, the fiber was dyed in yellow shade. The color fastnesses of the dyed fiber to sunlight, laundering and dry cleaning were found to be equal to the JIS 5th grade respectively.

EXAMPLE 6

An ethylene-N-n-butylaminoethyl acrylate copolymer, containing 9.5 mole mole percent of N-n-butylaminoethyl acrylate units and having a melting point of 98° C. and an intrinsic viscosity of 0.66 dl./g. as measured in tetralin solution at 135° C. was added to polypropylene powder in an amount of 10% by weight based upon the polypropylene powder and the blended mixture was extruded into filaments at a temperature of 210° C. The filaments were drawn to 400% their initial length in hot water and then heat-treated at 120° C. for 30 minutes to prepare a fiber. This filter was dyed with a dyeing bath containing 3% OWF of acid dyestuff (Alizalin Light Green GS, trademark of Sandoz), 5% OWF of $H_2SO_4$, and 5% OWF of nonionic surfactant (liquid ratio 50:1) at 100° C. for 1 hour. The fiber was dyed in deep green shade. The fastnesses of the dyed fiber to sunlight, laundering and rubbing were found to be equal to the JIS 5th grade respectively and its fastness to dry cleaning with perchloroethylene also corresponded to the JIS 5th grade.

EXAMPLE 7

An ethylene-N,N-di-n-butylaminoethyl acrylate copolymer containing 5.5 mole percent of N,N-di-n-butylaminoethyl acrylate units and having a melting point of 110° C. and an intrinsic viscosity of 1.20 dl./g. was measured in tetralin solution at 135° C. was added to polypropylene powder in an amount of 10% by weight based upon the polypropylene powder and blended. The resulting mixture was extruded into filaments at a temperature of 210° C.

The filaments were drawin to 400% their initial length in hot water and then heat-treated at 120° C. for 30 minutes. The resulting fiber was dyed with a dyeing bath containing 3% OWF of 1:1 acid dye (Neolan Red GRE, trademark of Ciba, Ltd.; liquid ratio 50:1) at 100° C. for 1 hour. In this way, the fiber was dyed in deep red shade. The fastnesses of the dyed fiber to sunlight, laundering and rubbing were found to be equal to the JIS 5th grade respectively and its fastness to dry cleaning with perchloroethylene also corresponded to the JIS 5th grade.

EXAMPLE 8

An ethylene-N,N-dimethylaminobutyl arcylate copolymer containing 5.0 mole percent of N,N-dimethylaminobutyl arcylate units and having a melting point of 100° C. and an intrinsic viscosity of 0.70 dl./g. as measured in tetralin solution at 135° C. was added to polypropylene powder in an amount of 10% by weight based upon the polypropylene powder and blended. The resulting mixture was extruded into filaments at a temperature of 210° C. The filaments were drawn to 400% their initial length in hot water and then heat-treated at 120° C. for 30 minutes. The resulting fiber was dyed with a dyeing bath containing 3% OWF of 1:2 metallized dyestuff (Cibaran Blue BL, trademark of Ciba, Ltd.; liquid ratio 50:1) at 100° C. for 1 hour, whereby the fiber was dyed in deep blue shade. The fastnesses of the dyed fiber to sunlight, laundering and rubbing were found to be equal to the JIS 5th grade respectively and its fastness to dry cleaning with perchloroethylene also corresponded to the JIS 5th grade.

EXAMPLE 9

An ethylene-N,N-dimethylaminoethyl methacrylate copolymer containing 6.5 mole percent of N,N-dimethylaminoethyl methacrylate units and having a melting point of 98° C. and an intrinsic viscosity of 0.50 dl./g. as measured in tetralin solution was added to polypropylene powder in an amount of 10% by weight based upon the polypropylene powder and blended. The mixture was extruded into filaments at a temperature of 210° C. The filaments were drawn to 400% their initial length in hot water and then heat-treated at 120° C. for 30 minutes. The resulting fiber was dyed with the same dyestuff under the same conditions as in Example 1. The dyed fiber was in deep red shade. The fastnesses of this dyed fiber to sunlight, laundering and rubbing were found to be equal to the JIS 5th grade, and its fastness to dry cleaning with perchloroethylene also corresponded to the JIS 5th grade. A microscopic examination of the cross-section of this dyed fiber revealed that it had been uniformly dyed.

EXAMPLE 10

An ethylene-N,N-dimethylaminoethyl acrylate copolymer containing 49.5 mole percent of N,N-dimethylaminoethyl acrylate units and having a melting point of 90° C. and an intrinsic viscosity of 0.35 dl./g. as measured in tetralin solution at 135° C. was added to polypropylene powder in an amount of 1% by weight based upon the polypropylene powder and the mixture was extruded into filaments at a temperature of 210° C. The filaments were drawn to 400% their initial length and then heat-treated at 120° C. for 30 minutes. The fiber prepared as above was dyed with the same dyestuff under the same conditions as in Example 4. The dyed fiber appeared extremely deep in blue shade. The fastnesses of the fiber to sunlight, laundering and rubbing were found to be equal to the JIS 5th grade, and its fastness to dry cleaning with perchloroethylene also corresponded to the JIS 5th grade. A microscopic examination of the cross-section of the dyed fiber revealed that it had been uniformly dyed.

EXAMPLE 11

An ethylene-N,N-dimethylaminoethyl methacrylate copolymer, containing 7.4 mole percent of N,N-dimethylaminoethyl methacrylate units, and having a melting point of 105° C. and an intrinsic viscosity of 1.93 dl./g. as measured in tetralin solution at 135° C. was added to polypropylene powder in an amount of 5% by weight based upon the polypropylene powder and blended. The mixture was extruded into filaments at a temperature of 210° C. The resulting fiber was dyed with the same dye under the same conditions as in Example 2. The fiber was dyed in deep blue shade. The fastnesses of the dyed fiber to sunlight, laundering and rubbing were found to be equal to the JIS 5th grade respectively, and its fastness to dry cleaning with perchloroethylene also corresponded to the JIS 5th grade.

What we claim is:

1. Moldable polyolefin compositions consisting essentially of (a) a poly-1-monoolefin and (b) a copolymer consisting essentially of ethylene and an aminoalkyl acrylate compound having the following general formula

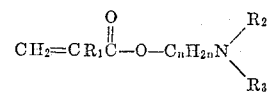

wherein $R_1$ is a member selected from the group consisting of hydrogen atom and methyl radical, $R_2$ and $R_3$ each is a member selected from the group consisting of hydrogen atom and alkyl radicals having 1 to 4 carbon atoms, and $n$ is an integer of 1 to 4 inclusive, said copolymer containing from 5 to 50 mol percent of aminoalkyl acrylate compound and having an intrinsic viscosity of 0.1 to 4.0 dl./g. measured in tetralin solution at 130° C., the content of the said copolymer being 1 to 30 weight percent based upon the weight of the said poly-1-monoolefin.

2. Moldable polyolefin composition according to claim 1, wherein the said aminoalkl acrylate compound is a member selected from the group consisting of N,N-dimethylaminoethyl acrylate, aminoethyl acrylate, N-methylaminoethyl acrylate, N-n-butylaminoethyl acrylate, N,N-di-n-butylaminoethyl acrylate, N,N-dimethylaminobutyl acrylate, and N,N-dimethylaminoethyl methacrylate.

3. Moldable polyolefin composition according to claim 1, wherein said polyolefin is polypropylene.

4. Moldable polyolefin composition according to claim 1, wherein the content of the said copolymer is 1 to 15 weight percent based upon the weight of the said poly-1-monoolefin.

5. An article shaped from a composition as defined in claim 1.

6. A fiber shaped from a composition as defined in claim 1.

7. Moldable polypropylene compositions consisting essentially of (a) a polypropylene and (b) a copolymer consisting essentially of ethylene and an aminoalkyl acrylate compound having the following general formula:

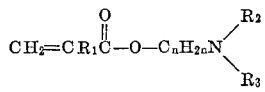

wherein $R_1$ is a member selected from the group consisting of hydrogen atom and methyl radical, $R_2$ and $R_3$ each is a member selected from the group consisting of hydrogen atom and alkyl radicals having 1 to 4 carbon atoms, and $n$ is an integer of 1 to 4 inclusive, said copolymer containing from 5 to 50 mol percent of aminoalkyl acrylate compound having an intrinsic viscosity of 0.1 to 4.0 dl./g. measured in tetralin solution at 130° C., the content of the said copolymer being 0.1 to 30 weight percent based upon polypropylene.

8. An article shaped from a composition as defined in claim 7.

9. Moldable polyolefin compositions consisting essentially of (a) a poly-1-monoolefin and (b) a bi-component copolymer of ethylene and an aminoalkyl acrylate compound having the following general formula

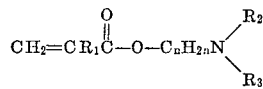

wherein $R_1$ is a member selected from the group consisting of hydrogen atom and methyl radical, $R_2$ and $R_3$ each is a member selected from the group consisting of hydrogen atom and alkyl radicals having 1 to 4 carbon atoms, and $n$ is an integer of 1 to 4 inclusive, said copolymer containing from 1 to 50 mol percent of aminoalkyl acrylate compound and having an intrinsic viscosity of 0.1 to 4.0 dl./g. measured in tetralin solution at 130° C. the content of the said copolymer being 0.1 to 30 weight percent based upon the weight of the said poly-1-monoolefin.

10. Moldable polyolefin compositions in accordance with claim 9 wherein the poly-1-monoolefin is polypropylene.

11. An article shaped from a composition as defined in claim 9.

References Cited
UNITED STATES PATENTS

| | | | |
|---|---|---|---|
| 3,156,743 | 11/1964 | Coover et al. | 260—897 |
| 3,170,004 | 2/1965 | Farago | 260—897 |
| 3,300,548 | 1/1967 | Baum et al. | 260—897 |
| 3,226,455 | 12/1965 | Matsubayashi et al. | 260—897 |

FOREIGN PATENTS 1,381,772  11/1964  France.

GEORGE F. LESMES, *Primary Examiner.*